April 2, 1963 V. P. DONNER ET AL 3,083,645
GEAR PUMP OR THE LIKE
Filed June 17, 1960 2 Sheets-Sheet 1

INVENTORS.
Verne P. Donner
Edward Mayer
Paul O. Pippel
Atty.

April 2, 1963  V. P. DONNER ET AL  3,083,645

GEAR PUMP OR THE LIKE

Filed June 17, 1960  2 Sheets-Sheet 2

INVENTORS.
Verne P. Donner
Edward Mayer

Atty.

United States Patent Office 3,083,645
Patented Apr. 2, 1963

3,083,645
GEAR PUMP OR THE LIKE
Verne P. Donner, Palatine, and Edward Mayer, North Riverside, Ill., assignors to International Harvester Company, Chicago, Ill., a corporation of New Jersey
Filed June 17, 1960, Ser. No. 36,932
9 Claims. (Cl. 103—126)

This invention pertains to gear pumps and the like.

Bearing failure has constituted a serious problem in gear pumps. Heretofore, bearing life has not been long in this type of pump.

To assure long life of the gear bearings and proper operation of the pump it is necessary that the two gears and supporting bearings therefor be unvariably held in fixed center distance and parallel relation to each other and further so that the bearings are in close fitting and full lineal engagement with their cooperating surfaces or in load supporting condition across the entire extents thereof.

The gears and bearings therefor have most commonly been supported in the end cap or other casing portion of a multipiece casing. It is impossible to establish the aforesaid necessary relation in such a casing supported arrangement within normal manufacturing tolerances and therefore it requires very close tolerances in a great many critical measurements including in the most difficult area to control and the source of the greatest error, namely, the mounting of the casing parts together by means of a multiplicity of bolts or studs, all of which must be carefully fitted and precisely located relative to the gear center distance and parallel relation to be established. Further, the relation of the gear teeth to the inside surface of the casing is critical for free or unbinding rotation of the gears together with development of the intended pump pressure.

Even with the costly close tolerances, or at least the attempt to have them, however, there are too many critical measurements involved to accurately and consistently control, without going to extremely close tolerances which are prohibited in cost in a competitive gear pump. This lack of control has resulted in bearing unreliability and the short bearing life that have existed with this type of gear and bearing support. It is also pointed out that mill cutting of the casing by the gear teeth qiute often occurs with this type of support producing bits of metal which are a danger to the bearings and otherwise quite undesirable.

Not only is this type of support productive of misalignment of the gears and bearings from the very beginning immediately after assembly, but loss of the center distance and parallel relation together with the full lineal contact of the bearings also occurs or worsens subsequent to aseembly. The latter is caused by shifting that takes place between the different parts of the casing as a result of different rates of thermo-expansion, for instance, and for other reasons including accelerated bearing wear as a result of misalignment already existing at least to a certain extent as a result of one of the other causes.

The other known type of arrangement has been to support each gear and the bearings therefor in a pair of end plate members within the casing. The outward or expansive forces of the pump pressure acting on the gears, however, cause a spreading of the gears and separation of the separate end plate members for each gear allowing mill cutting of the casing to take place and accompanying loss of the essential gear and bearing center distance and parallel relation thereof together with the full lineal contact of the bearings. Short and unreliable bearing life and frequent bearing failures are therefore also present in this type of gear bearing support. It is also pointed out that a special sealing problem exists along the common or mating surface of the end plate members when used as pistons or fluid pressure plates for end loading of the gears for sealing of the sides thereof, the sealing between the members likewise being disrupted or lost by separation and shifting of the plate members.

Accordingly, it is a primary object of the invention to establish the above stated necessary relation of the gears and bearings therefor during assembly and to preserve the same thereafter, for long bearing life in gear pumps.

A further object is to establish and preserve the above stated necessary relation of the gears and bearings, providing for long bearing life, at an appreciable cost reduction over the previous unsuccessful constructions.

It is another primary object of the invention to provide partial fluid pressure balancing of the gear peripheries to counteract some of the force exerted by the pump pressure on the gears, which partial balancing reduces the amount of the load on the bearings whereby to further prolong the life of the gear pump bearings.

Still another object is to provide partial fluid pressure balancing of the gear peripheries to such an extent as to change the resultant forces of the pump pressure acting on the gears from outward or expansive forces to inwardly directed forces of greatly reduced amounts, to eliminate the spreading forces of great magnitudes and undesirable effects and to further greatly prolong the life of the gear bearings by greatly reduced loading thereof.

Yet another object is to provide partial fluid pressure balancing of the gear peripheries to the greatest possible extent for the smallest possible loading of the pump gear bearings while yet allowing the pump to produce high outlet pressure.

A further object is to provide the above partial fluid pressure balancing of the gear peripheries to the extent noted and for the beneficial effects thereof with actual cost reduction.

It is a further primary object of the invention to provide a gear pump which in addition to establishing and retaining the gears and bearings therefor in fixed center distance and parallel relation to each other and in close fitting full lineal bearing engagement, also limits the positions to which the rotating teeth of the pressure producing pump gears are movable under operating conditions and under the action of the pump pressure during operation of the pump.

A still further object is to provide a gear pump in which the outer limits of the gear teeth are prevented from coming closer to the sealing surfaces, or surfaces with which they cooperate for the production of pump pressure, of the pump under the action of pump pressure and upon achievement of maximum intended pump pressure than to at least relatively lightly contact said sealing surfaces.

Yet another very important object is to provide a gear pump in which there is clearance between the outer limits of the gear teeth and sealing surfaces of the pump under pump operation producing pressure less than the maximum intended pressure and no more than the slightest or mere polishing contact between the gear teeth and sealing surfaces when the pump is producing maximum intended pump pressure, thus to totally prevent any galling or mill cutting of the sealing surfaces and further, to provide for complete free running of the pump gears at the very beginning immediately after assembly of the pump without the need of the time consuming and expensive running in operation necessary in all previous gear pumps.

Still another object of great importance is to provide a gear pump in which there is an extremely close yet non-galling relation of the gear teeth to the sealing surfaces of the pump for development of pump pressure, including the maximum pressure, without damage to the sealing surfaces and within the shortest possible length of sealing surfaces for the aforesaid greatest possible amount of fluid pressure balancing of the gear periphery.

A still further object is to provide a gear pump in which the center distance and parallel relation of the gears and bearings therefor and full lineal engagement of the bearings are fixedly established and preserved by a pair of combiantion gear supporting and end plate members for also sealing the opposite faces of the gears therebetween, the pump also having piston means to one side of one of the combination members effective to apply force, under the action of full pump pressure conducted therebehind, on said one combination member so as to counterbalance the resultant of the pump pressure acting on said combination member along the peripheries of the gears and during full range of the pump pressure to allow uniform unit sealing pressure to be applied by said combination member across the end faces of the gears under the action of an additional and resilient load applying means for fluid sealing of the gears between said combination member.

It is another important object to provide a gear pump in which the previously mentioned greatest source of error in establishing the fixed center distance and parallel relation of the gears and bearings therefor and full lineal engagement of the bearings, namely, the mounting of the end cap of the casing to the rest of the casing or of the casing parts together by means of a multiplicity of bolts or studs, has been eliminated, the establishment and preservation of the aforesaid relation of the gears and bearings therefor according to the present invention being completely independent of such mounting of the casing parts together, and in addition, to any shifting of the casing parts relative to each other after initial assembly and in the course of pump operation, as a result of different rates of thermal expansion of the casing parts and for other causes.

It is a further and important object to provide a gear pump in which the fixed center distance and parallel relation of the gears and bearings therefor and full lineal engagement of the bearings and also the proper close relation of the gear teeth to the sealing surfaces of the pump for development of the pump pressure is not dependent upon any critical measurement or measurements in or critical relation with the inside of the casing or any part or parts secured or affixed to the casing.

It is another important object of the invention to provide a gear pump in which all critical measurements are contained in a pre-assembled inner unit or cartridge which can be easily and conveniently gaged outside of the pump prior to assembly and which can be merely slipped into the casing in a non-critical fashion and the end cover of the casing bolted onto the casing, also in a non-critical fashion.

A further object is to provide a gear pump having a self-contained unit within the casing containing all the critical measurements and fixedly establishing and preserving the center distance and parallel relation of the gears and bearings therefor and full lineal engagement of the bearings, which unit is automatically shiftable under the action of the pump pressure within a non-critical casing into proper pressure producing sealing relation with sealing surfaces therewithin.

Other objects, advantages, and features of the invention will be disclosed in or become apparent from the following description, read with the accompanying drawing, in which.

Figure 1:
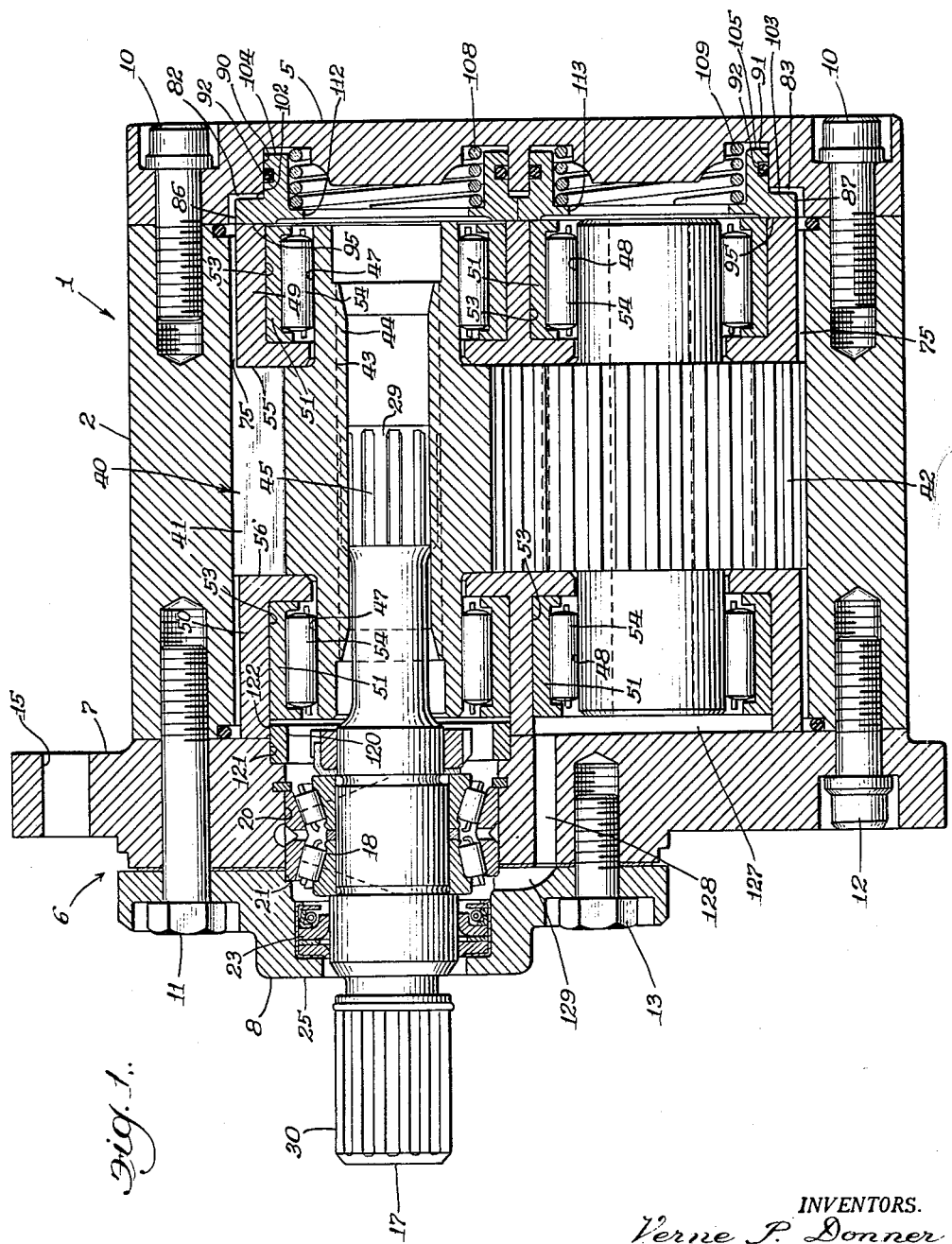
FIGURE 1 is a sectional view of a preferred form of the present invention taken on line 1—1 of FIGURE 2 but showing the complete pump.

Referring to the drawing figures in detail, the reference character 1 generally designates a gear pump casing comprising a center or body portion 2 having a pair of intersecting bores 3 and 4 extending therethrough and portions 5 and 6 closing the opposite ends of the bores. Bores 3 and 4 constitute gear-receiving or impeller-receiving chambers. The latter portion 6 is made up of two members consisting of an inner end cap member 7 and an outer seal retaining member 8. The end portions 5 and 6 are suitably secured to the center portion 2 by means of a plurality of cap screws 10, 11 and 12. The seal retaining member 8 is also attached to the end cap member 7 below the top by means of cap screws 13. The casing 1 together with the inner contents is adapted to be mounted on a suitable supporting structure by means of connecting bolts, not shown, passed through mounting openings, one of which is shown at 15 in the end cap member 7.

A drive shaft 17 extends through the casing portion 6 and into the hollow interior of the casing formed by the intersecting bores 3 and 4. The drive shaft 17 is supported within the end cap member 7 by means of a double row tapered bearing 18 received within a bore 20 in the end cap member. The bearing 18 is also partly received within a counterbore 21 of the seal retaining member 8, the engagement of the latter member with the bearing aligning the opening through the member with the bore 20 of the end cap member 7. A drive shaft seal 23 is contained within the member 8 outwardly of the counterbore 21, being retained therein by an angular flange 25 of the seal retainer member.

The bearing 18 provides the sole support of the shaft 17, the importance of which will be clearly brought out hereinafter. It is also pointed out that the double row tapered bearing 18 gives support to the drive shaft 17 over an extended area thereby to considerably reduce the amount of eccentricity present at the drive end 29 of the shaft, for instance. The location of the seal 23 immediately adjacent the bearing 18 together with the use of a double row tapered bearing supporting the drive shaft over an extended area provides for a minimum of shaft eccentricity where the shaft passes through the seal thereby to provide a much tighter sealing relation which will not deteriorate in time to produce leakage therepast. The outer end 30 of the drive shaft is adapted to receive power from any suitable source as by means of a coupling connection.

Received within the intersecting bores 3 and 4 of the gear pump casing 2 is the novel unit 40 of the present invention. This unit comprises a drive gear or impeller 41 and a driven gear or impeller 42 in meshed engagement along the area of intersection of the bores 3 and 4. These gears are of hollow construction along their respective axes and are provided with hollow hub extensions 47 and 48 on both sides or ends.

The unit 40 further includes impeller carrier means comprising a pair of gear support members 49 and 50 on each side of the gears respectively. Roller bearing units 51 of identical construction are received within counterbores 53 contained in each of the supporting members 49 and 50 for each of the hub extensions 47 and 48 of the gears. The support members 49 and 50 also have inner plane surfaces 55 and 56 for sealing engagement with opposite flat ends or faces of the gears 41 and 42. The roller bearing units 51 are pressed into the counterbores 53 of the support members 49 and 50 and the entire arrangement between the support members 49 and 50 with their contained bearings and the gear extensions 47 and 48 together with the entire gears 41 and 42 is such as to tightly support the gears in parallel axis and fixed center distance relation to each other and in bearing engagement across the entire extents of the bearings, over substantially the full life of the bearing units 51.

It is pointed out in this connection that once the gears 41 and 42 are properly supported with the necessary close tolerances to provide the parallel relation of their axes and full lineal bearing engagement or engagement along the extire extents of the roller bearings 54 the one piece support members 49 and 50 will retain the gears in that relation permanently and without expansion or outward movement of the gears away from each other as a result of the pump pressure acting thereon in the region of the outlet opening particularly. Such outward expansion, as heretofore mentioned, throws the gears out of the center distance and parallel relation to each other for deterioration of the bearings and resultant short life thereof and further, in many instances provides for galling or mill cutting of the inside of the casing where the pump pressure is developed.

Figure 2:
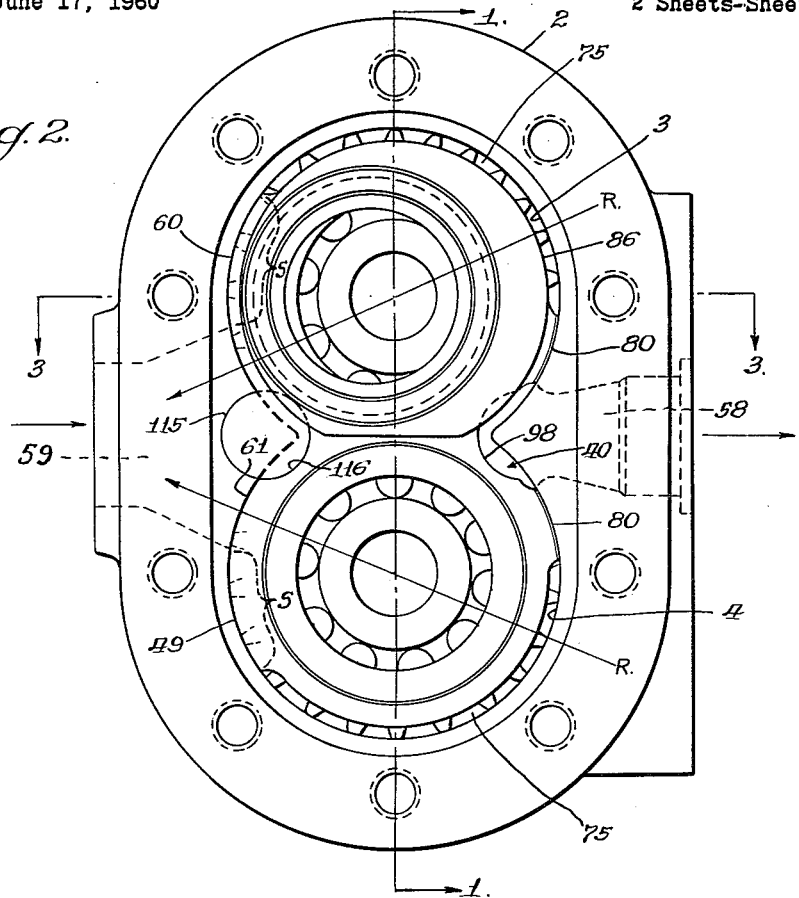
FIGURE 2 is an end elevational view of the gear pump as seen from the right in FIGURE 1 but with the end cap of the casing and the lower piston removed.
Figure 3:
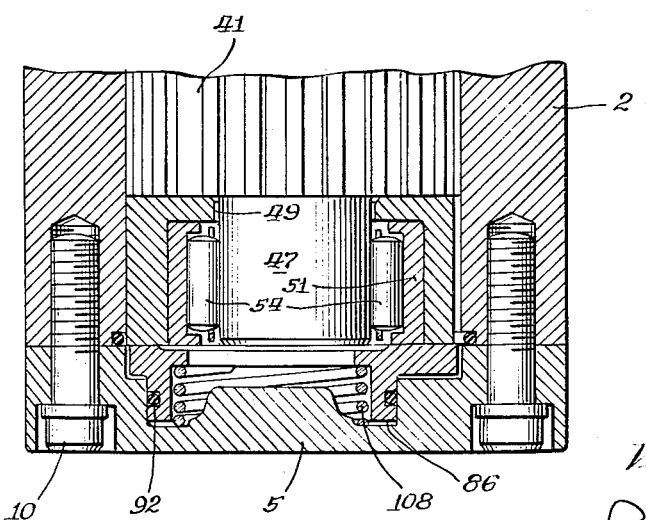
FIGURE 3 is a fragmentary sectional view taken on line 3—3 of FIGURE 2 but also including the casing end cap and a spring for the upper piston.

Each of the support members 49 and 50 is provided with arcuate peripheral portions 60 and 61 extending across the entire thicknesses of the members for engagement with the inside of the casing bores at least under the action of the pump pressure during operation of the pump, the axis of the peripheral surface portion 60 of each of the support members 49 and 50 being substantially coincident with the axis of the gear 41 in the upper bore 3 of the intersecting bores and the axis of the peripheral surface portion 61 of each of the support members 49 and 50 also being substantially coincident with the axis of the gear 42 in the bore 4. Arcuate portions 60 and 61 of the members 49 and 50 constitute casing wall sealing surfaces for sealing engagement with respective contiguous portions of the casing side wall containing an inlet passage 59. The unit 40 is assemblable outside of the gear pump casing 1 and merely slipped relatively loosely within the intersecting bores 3 and 4 thereof prior to securing of the end cap 5 to the rest of the casing. Accordingly, there is at least slight clearance or looseness of the unit 40 within the bores which is taken up by the action of the developed pump pressure acting in the neighborhood of the outlet 58 and along the right-hand half of each of the gears, as seen in FIGURE 2, which pressure pushes the gears and consequently the support members 49 and 50 towards the left or inlet 59 of the pump. Actual engagement of the support members 49 and 50 with the casing is had along the peripheral surface portions 60 and 61 of the members and with the inside of the casing bores 3 and 4, thus to saddle in to a fixed position relative to the pump casing at least during operation of the pump. The radii of the peripheral surface portions 60 and 61 are only slightly less than the radii of the pump bores 3 and 4 so as to allow the support members 49 and 50 to be easily received within the bores during assembly and the saddling engagement between the portions 60 and 61 and the inside of the casing.

In the present construction a critical relation exists between the radii of the gears 41 and 42 and those of the peripheral surface portions 60 and 61 of the two support members 49 and 50. Under the high pump pressure developed by the present pump, which is 3000 pounds per square inch for a pump delivering 30 gallons per minute, considerable deformation of the gears and the gear hubs together with a certain take-up of the bearings takes place. Such deformation of the gears and slight take-up of the roller bearings causes a slight shifting of the paths of the rotating teeth of the gears towards the left, as seen in FIGURE 2, or inlet side of the pump housing. According to the present invention, the radius of the addendum circle of the gear teeth of the two identical gears 41 and 42 are predeterminately slightly less than the equal radii of the peripheral surface portions 60 and 61 of the support members 49 and 50 so as to allow the ends of the rotating teeth to assume a predetermined relation relative to the inside surfaces of the pump casing with which they cooperate for the development of pump pressure.

Under operation of the pump at less than the maximum intended pump pressure the predetermined relation of the radii of the gears to those of the support portions 60 and 61 is such as to allow definite clearance between the ends of the teeth and the casing portions with which the teeth cooperate. Under the maximum intended pump pressure the predetermined relation of the radii prevents more than the slightest or mere polishing contact between the ends of the gears and the inside of the casing. It is therefore seen that the entire load resulting from the pump pressure acting on the gears is taken by the support members 49 and 50 even under the maximum intended pump pressure resulting in complete freedom from any galling or mill cutting of the casing and also in perfect free running of the gears within the casing under all operating conditions even immediately after assembly of the unit within the gear casing. It is pointed out in this connection that the diameters of the bores 3 and 4 are not in any way critical for the development of the intended pump pressure or the prevention of mill cutting but that the relation between the ends of the gear teeth and the inside of the pump casing is predeterminately established in all cases regardless of the size of the bores within the unit 40 itself of this invention, the unit merely shifting to the extent necessary into the saddled relation adjacent the inlet automatically to establish the desired very close relation between the ends of the gear teeth and the inside of the casing for the development of pump pressure.

It can be seen that if the necessary parallelism can be established between the gears 41 and 42 by the proper measurements within the gears and support members 49 and 50 and the roller bearings 54 are received between the gears and support members so as to have full lineal or bearing engagement along their entire extents, the parallel relation of the gears and fixed center distance thereof together with the full lineal contact of each of the bearings with their engaging hub portions of the gears will be preserved practically permanently without any misalignment or loss of the parallel relation and center distance of the gears. The only thing that can occur in the present invention and which cannot be eliminated is very gradual bearing wear along the entire extent of the bearings as a result of pure radial bearing load thereon, the present construction therefore providing for maximum bearing life over a tremendously long period free from unexpected bearing failure, which failure and short life is prevalent in previous pumps.

The present construction also contains another tremendously important provision which affords even greater life to the gear bearings. This increased bearing life is by way of providing partial fluid pressure balance of the gears, which will now be brought out.

In the ordinary gear pump the force from the developed pump pressure which has to be withstood by the gear bearings is the greatest in the neighborhood of the outlet of the pump and gradually although slightly lessens around the peripheries of the gears to about the plane of the gear axes where the actual pump pressure producing engagement or relation between the gears and the inside of the casing starts and continues from thence to the inlet of the casing. The resultants of the pump pressure acting on the gears are in a substantially upward and downward direction for the gears respectively, as in a FIGURE 2 viewing. If pump pressure can somehow be brought to the opposite side of the gears so as to partially oppose the pump pressure acting on the outlet half of the gears, the amount or size of each of the resultant forces which must be taken by the gear bearings can be substantially reduced therefore to further prolong the life of the bearings.

The extremely close non-galling relation between the ends of the gear teeth and the surface of the casing provided by the gear unit 40 of the present invention, which relation is uniformly had in all assembled pumps and which continues throughout the entire life of these pumps, permits even the maximum intended pump pressure to be developed along a substantially shorter inner casing surface or sealing surface than has heretofore been possible. According to the present invention, this pump pressure is developed over an inner casing or sealing surface S for each gear that is equal to two and one half times the distance between the addendum circle centers of two adjacent gear teeth, that is, of a two and one half teeth length. These sealing surfaces S constitute impeller-sealing portions or surfaces on the inlet-containing wall of the pump casing. These sealing surfaces S are adjacent to and on opposite respective sides of the pump inlet 59, circumferentially of the gears. Further, according to the present invention, the space occupied by the rotating gear teeth in each of the bores 3 and 4 is placed in direct communication with the pump outlet 58 immediately adjacent to and beyond the two and one half teeth length sealing surface S in the direction of gear tooth movement, whereby to allow the full pump pressure to be in the space occupied by the gear teeth immediately beyond each of the sealing surfaces, in the direction of gear tooth movement, and extending at least to the plane containing the gear axes. The path of this communcation can be traced in FIGURES 1 and 2 where it can be seen that a notch 98 extending axially of the pump in the waist portion of the figure-8-shaped gear-supporting member 49 serve as a passage communicating with the outlet 58 and extending therefrom into communication with chambers 82 and 83 around and behind the pistons 86 and 87 in the casing end cap 5. These chambers 82 and 83 communicate directly with the spaces 75 respectively at the upper and lower ends of the gear-supporting member 49 and then axially between the gear teeth. Said spaces between the gear teeth communicate with the spaces 75 respectively at the upper and lower ends of the gear-supporting member 50. In the present instance the upper terminus of the upper sealing surface S defines with the plane of the two gear axes, an angle of about 40° having its vertex at the axis of the upper gear 41. Likewise the lower terminum of the lower sealing surface S defines, with the plane of the two gear axes, an angle of about 40° having its vertex at the axis of the lower gear 42.

The full pump pressure acting over each of these 40° lengths apply an inward force to each of the respective gears in direct opposition to and so as to completely balance the effect of the pump pressure acting over a length of 40° completely opposite thereto on the other side of each of the gears in the area of the outlet 58 of the pump. Not only does this counterbalancing of forces eliminate the expansive or outward forces on the gears previously mentioned in connection with the prior constructions and change the resultant force of the pump pressure acting on each of the gears from an upwardly and downwardly directed outward force respectively to a downwardly and upwardly directed inward force respectively as indicated on FIGURE 2 of the drawing by the arrows R, but also very substantially decrease the value or amount of each of these resultant forces over those previously known by an exact amount represented by the 40° arcs which are counterbalanced.

The very greatly reduced resultant force on each of the gears which, of course, must be taken by the bearing therefor, very greatly reduces the load that must be so carried by the bearing to tremendously increase the bearing life thereof. It is further pointed out in this connection that by virtue of the greatly decreased value of the resultant forces applied to the gears there will be considerably less deformation of the gears and hubs thereof as a result of the pump pressure and particularly the maximum intended pressure, thereby to allow a much closer relation between the rotating gear teeth and the inside sealing surfaces of the casing than would otherwise be possible and than is possible in the prior pump constructions. This closer relation, of course, is what permits the decreased length or extent of the sealing surfaces of the pump casing in the first place. Further, the decreased fluid pressure load to be taken by the gears and other parts allows much less massive gear and hub designs, and therefore, a reduction in size and cost of these and other parts for a more economical and compact pump of small overall size.

It should be pointed out in connection with the foregoing that a rectangular pump inlet 59 is employed which extends across the entire length or cross extent of the gears 41 and 42 to provide minimum extent of the inlet in an upward and downward direction. The two sealing surfaces of minimum extent, as previously set forth, are immediately adjacent the inlet on each side thereof. This arrangement of minimum extent of the inlet and of the sealing surfaces reduces to the utmost the length of the pump casing which cannot be opened up to the full pump pressure for the pressure balancing of the gears.

In the present construction the fluid communication with the space occupied by the rotating teeth immediately beyond the sealing areas of the casing and extending at least to the plane containing the gear axes comprises a pair of oppositely disposed arcuate reliefs 75 one at each end of the support member 49, which reliefs extend cross the entire thickness of the member. These reliefs extend all the way from the outer ends of the peripheral portions 60 and 61 of the support member 49, which outer ends actually establish and determine the outer limits of the sealing surfaces of the casing, around the peripheries of the gear teeth to the outwardly extending arcuate peripheral portions 80 adjacent the outlet 58. The latter portions or lands 80 may be of the same radii and have the same centers as the portions 60 and 61, although they may be of reduced radii if desired. The arcuate lands 80 together with the portions 60 and 61 on the other side of the support member 49 provide approximate positioning of the unit 40 as the same is slipped into the casing during assembly.

The arcuate reliefs 75 are in fluid communication with chambers 82 and 83 respectively behind the respective gears. These chambers are provided around and behind a pair of pressure responsive or piston members 86 and 87 respectively received within the end cap member 5 between the same and the support member 49. These pistons are received for slight axial movement within bores 90 and 91 respectively in the casing member 5, being sealed therewithin by means of an O-ring 92 within a suitable annular groove in each of the piston members. The pistons each have an inner annular flat surface 95 for sealing engagement with flat end surfaces of the support member 49. The chambers 82 and 83, which join at the center thereof, are in direct communication with the outlet 58 by means of a cross relief 98 extending across the entire thickness of the support member 49. The chambers 82 and 83 are thus in direct communication with the outlet 58 for the application of full pump pressure to the pistons and also intercommunication with the reliefs 75 and the space occupied by the rotating gear teeth past, i.e., immediately after departure from registry with the arcuate portions 60 and 61 and sealing surfaces of the casing established thereby.

In addition to providing full pump pressure past the sealing surfaces of the casing, the arcuate reliefs 75 provide for another extremely important function. This is to provide for a complete absence of materials across the entire ends of the member 49 to allow full and unrestricted expansion of this support member in a lengthwise direction without tightly engaging the opposite ends of the casing that would cause a freezing in or seizing of that member with the casing. It is essential that no such freezing and consequent prevention of movement occur between the support member and casing inasmuch as the support member must be free to move in the direction of the gears for endwise loading and resulting fluid sealing of the gears between this member and the opposite support member 50.

The arcuate reliefs therefore provide complete freedom of expansion of the support member 49 in the lengthwise or greatest direction of expansion without interfering with the movement of the member parallel to the gear axes. It is pointed out that the reliefs 75 are such lengths that any contact between the peripheral portions 60 and 61 of the support member 49 and inside of the casing is not such as to restrict the aforesaid mentioned movement of the support member 49. For convenience and also in order to provide for expansion without producing warping and upsetting the sealing relation between the gear faces and the support member and the support member in turn with the inside of the casing, the member 50 is also provided with opposite reliefs and is otherwise of identical construction to the support member 49. It is also pointed out that the pressure balancing of the gears 41 and 42, which changes the resultant force on each gear from an outwardly extending force of large magnitude to an inwardly extending force to very greatly reduced magnitude, provided in part by the oppositely disposed reliefs 75 of the support member 49, also eliminates a bell mouthing or outward deflection of the portion of the support member 49 adjacent the pistons and of the portion of the support member 50 adjacent the end member 7 of the casing, which would cause lack of alignment of the gear bearings and also an out of flat or concave condition of the sealing surfaces 55 and 56 of the support members 49 and 50, respectively, which would allow for fluid leakage past the bearings and into the center part of the gears.

The pistons 86 and 87 are provided with surfaces 102 and 103 respectively, subject to the force of the fluid pressure therebehind, which are especially formed relative to the hub portions 104 and 105 so as to be eccentric or off-center relative thereto in the direction of the outlet 58. The extent of the eccentricity and the formation of the surfaces 102 and 103 are carefully calibrated so that the resultant of the pump pressure acting on each of said surfaces is directly opposite and of the same value as the resultant of the pump pressure acting between the gear teeth and around the peripheries of the gears respectively from the outer limit of the sealing surfaces around to the point of mesh, on the inside surface 55 of the support member 49. This end pressure balancing of the combined support and pressure plate member 49 is, of course, to provide for even loading pressure across the face of the gears in order to provide for substantially permanent fluid sealing engagement of each gear face.

Inasmuch as the action of the fluid pressure between the support members 49 and 50 is balanced by the pistons 86 and 87, actual sealing force is provided by coil springs 108 and 109 received between the end cap 5 and an annular flange portion of each of the piston members, as shown. The springs, of course, apply a relatively light but adequate force against the support member 49 which in turn presses against the gears 41 and 42, the gears pressing in turn against the support member 50 which is pressed against the inside of the cap 7, thereby to provide fluid sealing of the opposite faces of the gears with the flat surfaces 55 and 56 of the support members. The springs keep the pistons and the other parts in close contact with each other initially when the pump starts and also during the entire range of pump operation. The pistons 86 and 87 are provided with openings 112, 113, respectively, extending axially through the centers thereof. This is of importance, with the fact that the coil springs 108 and 109, the hubs 104 and 105, and the effective pressure responsive portions of the pistons are all outwardly of these bores 112 and 113, in order to allow the pump to be used intact for dual or plural pump use merely by providing an opening in the end cap member 5 along the axis of the drive shaft 17 so that an extended drive shaft may pass through the piston 86 into an additional stage or stages of the plural pump, connected onto the present casing to the right of that shown in FIGURE 1. The opening 113 in the piston 87 is in order to have identical pistons, for ease of manufacturing, assembly, and other reasons.

The pistons 86 and 87 are completely noncritical in their measurements and are noncritically received in the end cap 5 thereby to reduce the cost of the pump and considerably simplify its construction. The one-piece combination support and end plate members 49 and 50 provide, in addition to the support of the gears and bearings therefor in parallel fixed center relation with full linear bearing engagement for the long bearing life, for continuous sealing of the space occupied by the gears without any interruption or mating surface between separate members which allows leakage therethrough as in the case of many prior pump constructions, thereby to eliminate the troublesome leakage problem therein existing and the need of special and often unsatisfactory sealing provisions. The use of pistons 86 and 87 for the production of the force for counterbalancing the effect of the fluid pressure between the gear teeth and therearound, separate and apart from the gear supporting and end plate member 49 allows complete independence of the pistons and support member 49 except for the passage of the forces from the former to the latter for the pressure balancing function. The unit 40 is therefore free to shift within the casing to the extent necessary to provide the saddling in of the arcuate surface portions 60 and 61 of the support members 49 and 50 with the inside surfaces of the counterbores 3 and 4 respectively and also to expand and otherwise move to any extent necessary without affecting the operation of the piston members.

A plug member 115 is at each side of the casing being partly received within an arcuate cutout portion 116 in each of the support members 49 and 50, which cutout portion is identical to the relief 98 on the opposite side. Each of the plugs 115 are so provided to fill up the relieved portions 116 on the inlet side of the pump so as to allow for the development of pump pressure without loss thereof.

A further very important aspect of the present invention is to provide for the separate support of the drive shaft 17 and of the unit 40 together with its drive gear 41 so that the latter drive gear and drive shaft will be completely out of contact with each other except for the transmission of rotational driving force from the shaft to the gear. This is for the purpose of completely isolating the drive gear 41 from the drive shaft 17 except for the driving relation above mentioned so as to prevent the transmission of destructive eccentric movement of the end 29 of the drive shaft to the drive gear 41 for subsequent transmission to the gear bearings 54 for added impact load thereon of a very destructive nature. The divorced relation between the drive shaft and gear also eliminates the transmission of forces resulting from any bending moment present in the drive shaft to the drive gear for subsequent impression on the gear bearings.

It has previously been pointed out that the double row tapered bearings 18 have substantially reduced eccentricity of the end portion 29 of the drive shaft. To provide for the spaced-apart relation of the end portion 29 of the shaft and the inside hollow portion 43 of the drive gear 41, the diameter of the opening through the gear 41 in the center part thereof excluding inwardly extending spaced splines 44 around the inner periphery of the opening 43 is larger than the diameter of the end portion 29 of the shaft including outwardly extending splines 45 around the periphery thereof and further, the diameter of the end portion 29 of the shaft 17 excluding the splines 45 being smaller than the opening 43 of the gear including the spaced splines 44 thereof.

In order to establish a coaxial concentric relation of the drive gear 41 to the drive shaft 17 during assembly an annular member 120 is employed, being received within a counterbore 121 in the end member 7 of the pump casing which counterbore is coaxial with the bore 20 containing the bearings 18 and through the bearings the drive shaft 17. The annular member 120 has an outer cylindrical surface 122 for the reception within the counterbore 121 and also extends outwardly of the end member 7 within the interior of the bore 3 of the pump casing. The counterbore 53 of the gear support member 50, which tightly receives the bearing unit 51 and which is coaxial with the axis of the drive gear 41 as supported within the bearings, extends outwardly of the bearing 51 for reception on the outer cylindrical surface 122 of the angular member 120. In this manner the axis of the drive gear 41 is definitely established in coaxial relation with the axis of the drive shaft 17. This coaxial relation is for the preservation of clearance between the end portion 29 of the shaft 17 and the drive gear 41. Adequate clearance is preserved after assembly by internal friction caused by the loading exerted against the side of the unit 40 by the coil springs 108 and 109 which abut against the end cap member 5 after securement of the latter to the pump casing during assembly. The end loading on the unit 40 is not so great as to prevent the slight shifting of the unit within the casing for the saddling in of the arcuate surface portions 60 and 61 of the support members 49 and 50 for the development of the proper pump pressure between the gear teeth and the inside of the pump casing. The space between the end portion 29 of the drive shaft 17 and the inside of the drive gear 41 is sufficiently great to take into account the slight shifting movement and also the expansion that takes place within the inner unit 40.

It is therefore clear that the gear bearing life is further greatly lengthened and early and unexpected failure eliminated by the separately supported spaced-apart relation of the drive shaft 17 and drive gear 41 except for the passage of mere rotational driving force.

All of the bearings of the present pump are lubricated by oil under high pressure and positive circulatory flow from the pump outlet by communicating means not shown, through the hollow centers of each of the gears after lubrication of the bearing units 54 on the right-hand side as seen in FIGURE 1 and thence through space 127 opposite the lower gear 42 into the gear unit 51 adjacent thereto, through passage means 128 and 129 into the tapered bearing 18 and from the hollow interior of the upper gear 41 and bearings 51 thereof to tank not shown.

It should be evident from all of the above that a novel gear pump has been provided in which the maximum possible gear bearing life is had together with total absence of galling or mill cutting of the inside of the casing even from the beginning immediately after assembly and further with fluid pressure balanced end loading of the pump gears for sealing thereof, the above being provided by an extremely simple construction in which all the critical measurements are contained within a compact unit which is assembled and inspected outside of the pump and non-critically placed therewithin to automatically assume a predetermined close sealing within the casing for the production of a much higher maximum pump pressure than heretofore known, all of the above being accomplished with an actual cost reduction over previous pumps.

Although the present application has been directed to a gear pump it is also desired to have the same apply to and cover a fluid motor having the same or a portion of the same construction and within the structural coverage of the claims.

Such terms as upper and lower are merely relative to position of the pump shown in the drawing and are not to be taken in an absolute sense in the specification or claims.

It should be clearly understood that the disclosed structure is merely illustrative of the principles of the present invention and is not to be taken as limiting the appended claims which should be read broadly in view of the overall spirit and principles of the invention in its various aspects.

We claim:

1. In a gear pump or the like, a casing comprising a portion with intersecting bores therethrough and portions at least substantially closing the opposite ends of the bores, the casing also having an inlet communicating with said bores at one side thereof, an outlet communicating with said bores at the opposite side thereof, and each bore having a sealing area adjacent said inlet, a pair of gears in meshed relation within the bores one within each bore and disposed with their axes parallel with and respectively contiguous with the principal axes of said bores, each gear having bearing engageable means, a pair of support members within the bores one on each side of the gears, the support members having means engaging the bearing engageable means of the gears for sole bearing support of the gears in substantially parallel and fixed center relation to each other, each support member having arcuate peripheral portions respectively in said bores in approximate coaxial relation therewith and said members being displaceable transversely of the bore axes to dispose said arcuate peripheral portions in or out of seated sealing relation with the bore sealing areas, said support members being subjected to the pressure of fluid at said outlet to be urged thereby into said seated relation during normal operation of the pump, the arcuate portions of the support members in the same bore having substantially the same axis as the gear within that bore, the radius of each gear being less than the radius of the arcuate portions of the support members within the bore containing the gear by a predetermined amount sufficient to prevent the outer limits of the teeth of the gear from coming closer than to lightly contact the inside surface of the bore containing the gear under the action of pump pressure upon achievement of maximum intended pump delivery pressure.

2. In a pump, a casing having intersecting impeller-receiving chambers and opposite walls respectively containing an inlet and an outlet each communicating with said chambers, said chambers having impeller-sealing portions on the inlet-containing wall, impeller carrier means disposed loosely in said chambers in the respect of being displaceable therein toward and away from said walls directly under the pressure of fluid at said outlet, said carrier means comprising bearing means and having impeller-sealing surface means and casing wall sealing surface means, complemental impellers journaled in the carrier bearing means for rotation about parallel axes respectively intersecting said chambers between said casing walls, each impeller having an end sealing surface in sealing relation with the impeller sealing surface means of the carrier means, and said inlet-containing wall having sealing surface means disposed on opposite sides of said inlet in opposed complemental relation with the casing wall sealing surface means of said carrier means and operable when engaged thereby attendant to displacement of the carrier means toward said inlet-containing wall to gauge proximity of the impellers to said impeller-sealing portions of said chambers.

3. The combination set forth in claim 2 wherein the carrier means has outer face means on a side thereof opposite from the impeller-sealing surface means within a plane parallel with the direction of said displacement of such carrier means, and wherein there is means within the casing slidably engaged with said outer face means and operable to exert pressure thereagainst to urge the carrier means toward the impellers and thereby create sealing pressure between the impeller-sealing surface means and the impeller end sealing surfaces.

4. In a pump, a casing having intersecting impeller-receiving chambers and opposite walls respectively containing an inlet and an outlet communicating with said chambers, said chambers having impeller-sealing portions on the inlet-containing wall and also carrier-sealing portions on the inlet-containing wall respectively contiguous with the impeller-sealing portions, a rigid impeller carrier structure disposed loosely in said chambers in the respect of being displaceable therein toward and away from said walls directly under the pressure of fluid at said outlet, said carrier structure comprising bearings respectively registering with said chambers and having casing-wall sealing surface means, complemental impellers respectively in said chambers and journaled in the carrier structure bearings for rotation about parallel axes respectively intersecting said chambers between said casing walls while ends of such impellers are in sliding sealing relation with the carrier structure, said carrier structure and its bearings being effective to hold the impellers in fixed center relation to each other and cause displacement of the impellers unitarily with the displaceable carrier structure, and the casing-wall sealing surface means being sealingly engageable with said carrier-sealing portions on the inlet-containing wall attendant to displacement of the carrier means toward such wall to cooperate therewith for gauging proximity of the impellers to said impeller-sealing portions of said chambers.

5. The combination set forth in claim 4 wherein said carrier structure has an inner side in said sealing relation with the ends of the impellers and has an opposite outer side within a plane parallel with the direction of said displacement of the carrier structure, and wherein there is means within the casing slidably engaged with said outer side and operable to exert pressure thereagainst to urge the carrier structure toward the impellers and thereby create sealing pressure between said inner side of the carrier structure and the ends of the impellers.

6. In a gear pump, a casing comprising an intermediate portion with an opening therethrough and end portions closing the opposite ends of the opening, a pair of gears in meshed relation within said opening, a pair of support members within the opening one on each side of said gears, said support members having bearing means engaging said gears for sole bearing support of said gears in substantially parallel and fixed center relation to each other about individual axes thereof, said casing and said support members defining cooperable surfaces, said support members being loosely disposed in said opening and movable transversely of said gear axes directly under the action of pump pressure during normal operation of the pump to effect engagement of said cooperable surfaces, said casing having additional surface means extending across the length of the gear teeth and forming sealing areas for cooperation with the gear teeth for the generation of pump pressure, said gears and said support members being formed so that engagement of said cooperable surfaces determines the position of the rotating teeth of said gears relative to said sealing areas during normal operation of the pump, said casing having inlet means on one side of the plane containing said gear axes for the delivery of inlet fluid to the gear teeth, said sealing areas being two areas with said inlet means therebetween, said casing having outlet means beyond said sealing areas and on the other side of said plane, each sealing area terminating at its limit farthest removed from said inlet means on the said side of said plane as the inlet means and short of said plane.

7. The combination set forth in claim 6 wherein space is provided beyond each sealing area adjacent the gear teeth and in communication with said outlet means so as to direct substantially full pump pressure thereto.

8. The combination set forth in claim 7 wherein said space extends from immediately beyond each sealing area to said outlet means.

9. The combination set forth in claim 6 wherein one of said support members is movable parallel to said gear axes, said one support member being relieved across each end and throughout the thickness thereof axially of said gears, the reliefs extending on each side of said plane and being adjacent to and in fluid communication with the space occupied by the gear teeth from immediately beyond each of the sealing areas, the reliefs being in such fluid communication with said outlet means as to produce pump discharge pressure within the reliefs and space occupied by the gear teeth from immediately beyond the sealing areas.

References Cited in the file of this patent

UNITED STATES PATENTS

| | | |
|---|---|---|
| 1,595,982 | Appel | Aug. 17, 1926 |
| 1,880,108 | Ross | Sept. 27, 1932 |
| 2,660,958 | Lauck | Dec. 1, 1953 |
| 2,691,945 | Wichorek | Oct. 19, 1954 |
| 2,714,856 | Kane | Aug. 9, 1955 |
| 2,728,301 | Lindberg | Dec. 27, 1955 |
| 2,746,394 | Dolza et al. | May 22, 1956 |
| 2,765,749 | Mosbacher | Oct. 9, 1956 |
| 2,769,396 | Norlin | Nov. 6, 1956 |
| 2,781,730 | Newmier | Feb. 19, 1957 |
| 2,822,759 | Norlin | Feb. 11, 1958 |
| 2,865,302 | Murray | Dec. 23, 1958 |
| 2,870,720 | Lorenz | Jan. 27, 1959 |
| 2,891,483 | Murray et al. | June 23, 1959 |
| 2,900,920 | Compton | Aug. 25, 1959 |
| 2,923,248 | Hodgson | Feb. 2, 1960 |
| 2,932,254 | Booth et al. | Apr. 12, 1960 |
| 2,993,450 | Weigert | July 25, 1961 |

FOREIGN PATENTS

| | | |
|---|---|---|
| 205,862 | Austria | Oct. 26, 1959 |
| 536,036 | Italy | Nov. 21, 1955 |
| 732,914 | Germany | Mar. 15, 1943 |
| 782,701 | Great Britain | Sept. 11, 1957 |
| 853,547 | Great Britain | Nov. 9, 1960 |
| 1,073,038 | France | Mar. 17, 1954 |

OTHER REFERENCES

Germany, (Kl. 59e 3/01), 1,055,365, Apr. 16, 1959.